(12) United States Patent
Moffett et al.

(10) Patent No.: US 7,287,334 B2
(45) Date of Patent: Oct. 30, 2007

(54) LOCOMOTIVE WHEEL REFERENCE GROOVE DIAMETER MEASURING DEVICE

(75) Inventors: Jeffrey Paul Moffett, Wattsburg, PA (US); Larry D. Moneymaker, Erie, PA (US); Mark Douglas Smith, Jacksonville, FL (US); Marc DiMattio, Erie, PA (US)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 11/217,774

(22) Filed: Sep. 1, 2005

(65) Prior Publication Data

US 2007/0044330 A1 Mar. 1, 2007

(51) Int. Cl.
*G01B 5/08* (2006.01)

(52) U.S. Cl. ...................... 33/203.18; 33/483
(58) Field of Classification Search .................. 33/194, 33/203, 203.18, 483–485, 490, 494, 832, 33/833
See application file for complete search history.

(56) References Cited

U.S. PATENT DOCUMENTS

| | | | | |
|---|---|---|---|---|
| 1,599,852 A | * | 9/1926 | Thomas | 33/485 |
| 3,443,318 A | * | 5/1969 | MacMillan | 33/203.18 |
| 3,824,700 A | * | 7/1974 | Rutty | 33/451 |
| 4,507,869 A | * | 4/1985 | Stude | 33/485 |
| 4,730,399 A | * | 3/1988 | Campbell | 33/203 |
| 5,430,947 A | * | 7/1995 | Courtney | 33/485 |
| 5,509,212 A | * | 4/1996 | Henricksen | 33/483 |
| 5,636,026 A | | 6/1997 | Mian et al. | |
| 6,049,991 A | * | 4/2000 | Gruenberg et al. | 33/485 |
| 6,662,456 B1 | * | 12/2003 | Triplett | 33/203 |
| 6,768,551 B2 | | 7/2004 | Mian et al. | |
| 2002/0170189 A1 | * | 11/2002 | Cheatham | 33/194 |
| 2005/0183281 A1 | * | 8/2005 | Kennedy | 33/833 |

FOREIGN PATENT DOCUMENTS

| | | |
|---|---|---|
| DE | 475 229 C | 4/1929 |
| GB | 2 406 390 A | 3/2005 |
| WO | WO 01/35048 A | 5/2001 |

\* cited by examiner

*Primary Examiner*—G. Bradley Bennett
(74) *Attorney, Agent, or Firm*—Carlos Luis Hanze, Esq.; Terry M. Sanks, Esq.; Beusse Wolter Sanks Mora & Maire, P.A.

(57) ABSTRACT

A railroad wheel reference groove locating gauge for determining a measurement of an annular reference groove machined in a face of a railroad wheel spaced radially outwardly from an axle on which the wheel is mounted a predetermined distance indicative of the wheel diameter, with the measurement being taken while the wheel remains connected to the axle, the gauge comprising an elongate member having a first end and a second end, indicia on the elongate member at the first end thereof indicative of a length along the elongate member; and an attachment element at the second end of the elongate member for detachably securing the gauge relative to an axis of rotation of the axle, with the elongate member extending radially to the first end thereof adjacent the reference groove on the wheel for enabling the use of the indicia to determine the diameter of the reference groove.

11 Claims, 2 Drawing Sheets

LOCOMOTIVE WHEEL REFERENCE GROOVE DIAMETER MEASURING DEVICE

FIELD OF THE INVENTION

This invention relates generally to the field of rail transportation and, more particularly, to a device for measuring locomotive wheel reference groove diameter.

BACKGROUND OF THE INVENTION

A typical train includes one or more locomotives pulling a plurality of load cars. Each vehicle in the train includes a plurality of steel wheels that roll along the metal rail as the train is propelled along the track. Proper interaction between the wheel and the rail is critical for safe, reliable, efficient operation of the train.

A rail includes a bottom mounting flange, a top railhead that makes contact with the vehicle wheel, and a flange interconnecting the flange and the railhead. A vehicle wheel includes a center hub mounted onto the vehicle axle, a plate extending outwardly from the hub, and an outer rim surrounding the plate for making contact with the rail. The rim includes an outside diameter tread that may be flat or tapered and a flange extending outwardly from a back side of the tread. The tread rides along a top surface of the railhead for supporting the vertical weight of the vehicle. The flange extends along and makes contact with a side of the railhead for providing lateral support to allow the wheel to follow along the path of the railhead. Flanges are provided on only one side of each wheel along an inside of the rail.

Rail, or railroad, vehicle wheels suffer wear over time due to their contact with the rail. The treads wear as a result of their contact with the top of the rail, particularly in the event of the wheel slipping with respect to the rail during acceleration or braking events. The wheel flanges will wear due to their contact with the inside surface of the railhead, particularly on curves and through switches. Consequently, rail wheel wear must be monitored to ensure that dimensions of the wheel subject to wear are sufficient for continued safe use.

In the past, rail wheel dimensions were periodically measured using a Federal Railway Administration (FRA) approved mechanical gauge. More recently, mechanical gauges have been replaced with electronic gauges that provide more accurate and repeatable rail wheel measurements for determining proper positioning on the wheel and to measure rail wheel dimensions such as rim thickness, flange thickness, flange height, and distance from reference groove (also called witness groove) of a locomotive wheel. With both mechanical gauges and electronic gauges, a key measurement that is needed to determine the other rail wheel dimensions is the reference groove diameter since the reference groove diameter is typically used as a reference when determining wheel diameter by adding 2 times the distance from reference groove.

BRIEF DESCRIPTION OF THE INVENTION

A railroad wheel reference groove locating gauge is disclosed. The gauge is for determining a measurement of an annular reference groove machined in a face of a railroad wheel spaced radially outwardly from an axle on which the wheel is mounted a predetermined distance indicative of the wheel diameter. The measurement is taken while the wheel remains connected to the axle. The gauge comprises an elongate member having a first end and a second end, and indicia on the elongated member at the first end thereof indicative of a length along the elongate member. An attachment element at the second end of the elongate member is also provided. The attachment element is operable for detachably securing the gauge relative to an axis of rotation of the axle, with the elongate member extending radially to the first end thereof adjacent the reference groove on the wheel for enabling the use of the indicia to determine the diameter of the reference groove.

In another preferred embodiment, a railroad wheel reference groove locating gauge is disclosed. The gauge is for determining a measurement of an annular reference groove machined in a face of a railroad wheel spaced radially outwardly from an axle on which the wheel is mounted a predetermined distance indicative of the wheel diameter. The measurement is taken while the wheel remains connected to the axle which is in turn connected to a railroad vehicle. The gauge comprising an elongate member having a first end and a second end, and an opening formed therethrough the elongate member through which the annular reference groove may be visible. An attachment element at the second end of the elongate member is also provided. The attachment element is operable for detachably securing the gauge relative to an axis of rotation of the axle, with the elongate member extending radially to the first end thereof adjacent the reference groove on the wheel for enabling the use of the indicia to determine the diameter of the reference groove.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Though both electronic and mechanical gauges exist to measure various rail wheel dimensions, a key piece of information that is needed in either calculating and/or measuring various wheel dimensions is the reference groove diameter. The reference groove diameter and the distance from reference groove is used to determine wheel diameter. Currently, the reference groove diameter is measured with such devices as a tape measure. However, reliably obtaining an accurate measurement is not guaranteed in the prior art since it is hard to take a measurement of the reference groove diameter due in part to the equipment or mechanical parts around the wheel which result in limited space around the wheel and axis, and the numerous possible reference points on the axle vary in size.

Figure 1:
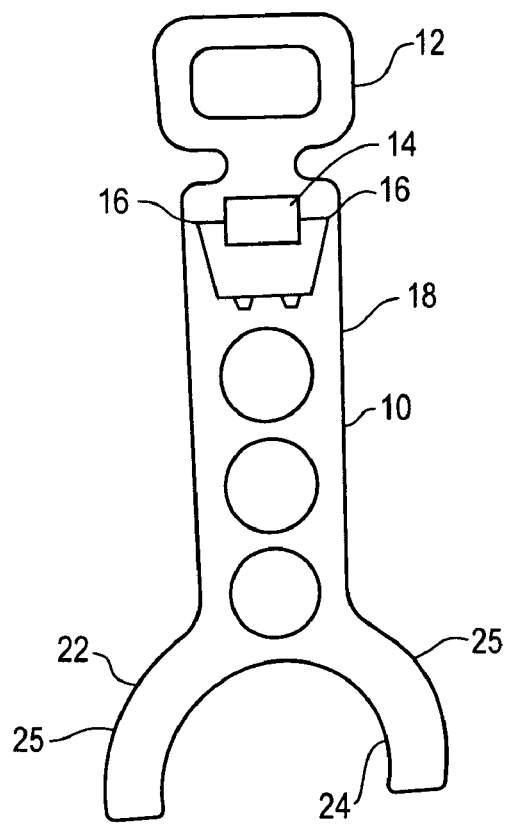
FIG. 1 is an illustration of an exemplary embodiment of a locomotive wheel reference groove diameter measuring device.

FIG. 1 shows an exemplary embodiment of a locomotive wheel reference groove diameter measuring device, or gauge 10. A handle 12 is formed at one end of the measuring device 10. The handle 12 is of a size so that an adult human hand may fit within the handle 12 to hold and maneuver the measuring device 10 for its intended purpose. Immediately below the handle 12 is a window 14, or opening. Pointers 16 are provided on the measuring device 10 that point towards an edge of the window 14 or extend into the window 14. The pointers 16 are provided as guides to point to the reference groove 40 of a particular wheel 32 that the measuring device 10 is positioned to determine the reference groove diameter. Though a window with pointers are disclosed, those skilled in the art will readily recognize that pointers, or indicia, can be marked on a middle span, discussed in detail below. Likewise, the present invention can also be made without a handle as disclosed above.

Below the window 14 there is a middle span, or elongate member, 18 that is approximately a foot and a half long. In a preferred embodiment, this span 18 is at a fixed distance, but those skilled in the art will recognize that an adjustable span could be utilized as well. At the end of the span 18 is a two-pronged foot 22, or attachment element. The inner edge 24 of the two-pronged foot 22 forms a circular shape wherein the length of the prongs 25 extend beyond the length of a semi-circle. In other words, though the two-pronged foot 22 appears to form a semi-circle, the length of the prongs 25 exceed the length required to form a semi-circle. The inside diameter of the two-pronged foot 22 is of a distance to fit around an axle 34.

Figure 2:
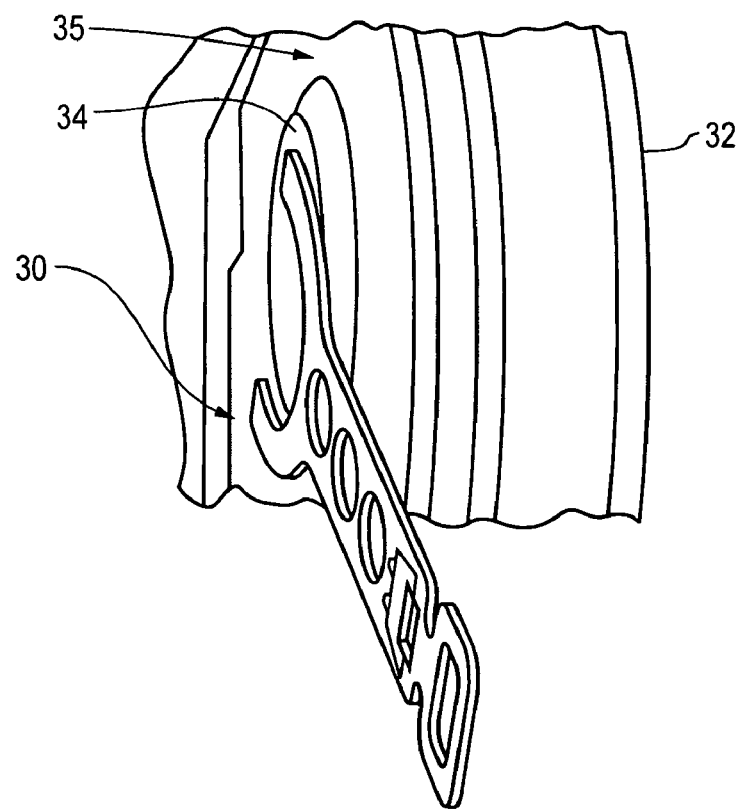
FIG. 2 is an illustration of an exemplary embodiment of the measuring device used with a locomotive wheel.

As illustrated in FIG. 2, the two-pronged foot 22 of the measuring device 10 fits between a journal bearing backer 30 and a front side of a wheel 32. Because of the distance between the two prongs 25, the measuring device 10 will not be able to ride up on the journal bearing backer 30, and measuring device 10 will not be able to ride up on the radius of the axle machining 33 or wheel hub 35. Instead, because of the configuration of the two-pronged foot 22, the measuring device 10 is forced to self locate exactly on the axle 34. Because the equipment on and around an axle may vary, those skilled in the art will readily recognize that the attachment element is in actuality configured for detachably securing the measuring device relative to an axis of rotation of the axle. Towards this end, the attachment element is configured so that it can be secured either to one of a plurality of diameters machined into the axle and/or to a bearing attached to the axle.

Figure 3:
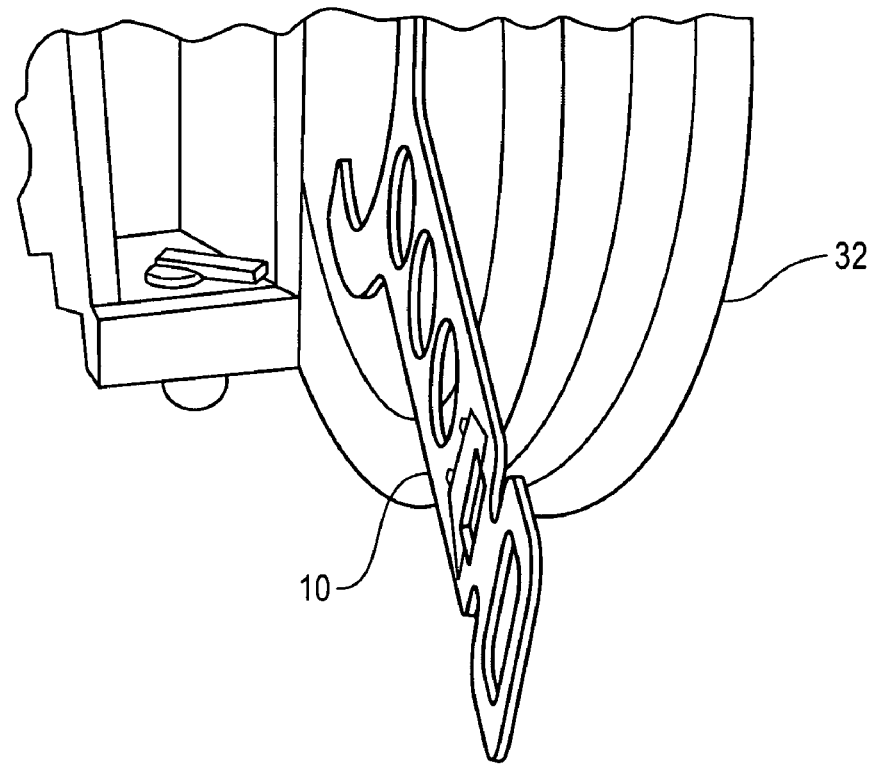
FIG. 3 is an illustration of an exemplary embodiment of the measuring device fitting between a bearing backer and a wheel hub.
Figure 4:
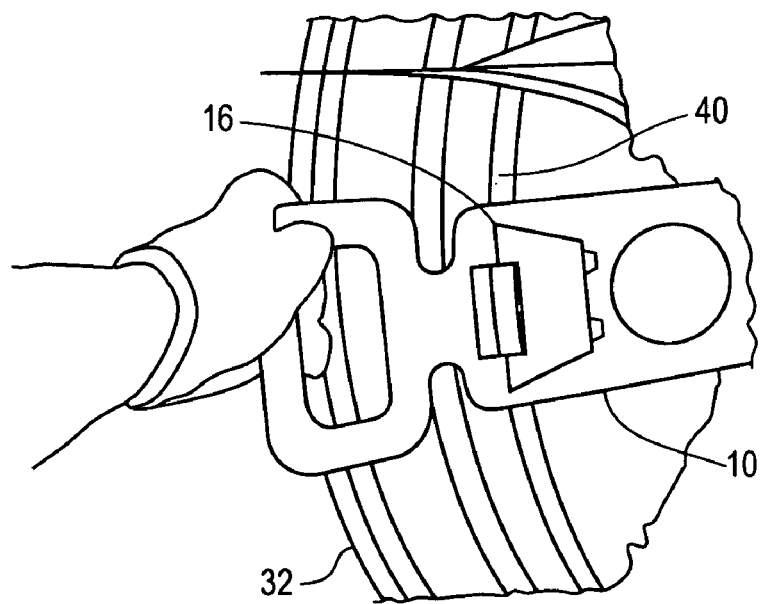
FIG. 4 is an illustration of an exemplary embodiment of a window on the measuring device being used to determine a reference groove diameter.

In operation, a user would use the handle 12 to place the two-pronged foot 22 end of the measuring device 10 between the journal bearing backer 30 and the front of the wheel 32 at either the 5 o'clock or 7 o'clock position, as is illustrated in FIG. 3, while the axle and hence the well are still connected to the locomotive. As the measuring device 10 is rotated, it will self locate wherein the axle 34 will bottom out against the interior of the two-pronged foot 22. Once in position, as illustrated in FIG. 4, the reference groove 40 on the wheel may be visible within the window 14. Thus, the reference groove 40 is either visible within the window 14 and lines up with the pointers 16, or it does not. With respect to locomotives manufactured by the Assignee, either reference grooves of 38 inches or 36 inches are utilized based on the dimension of the wheel 32. Thus, if the measuring device 10 is manufactured for a 38-inch reference groove diameter, and if the reference line 40 is visible within the window 14, then the user knows that the reference groove diameter is 38 inches. However, if the reference groove diameter is not visible within the window but is instead visible along the outside of the measuring device 10 below the window 14, then a user would know that the wheel being measured has a groove reference of 36 inches.

In another preferred embodiment, where the middle span 18 is adjustable, the user could set the length that is to be measured, such as either 38 inches or 36 inches. Then based on where the reference groove 40 is visible, either in the window 14, below or above the window (depending of the setting used for the middle span 18), the user will know the reference groove diameter.

The geometric configuration of the measuring device 10 is configured to result in a device that is lightweight while retaining its durability. Towards this end, the measuring device 10 is of a weight to allow for ease of use by the user while still being durable enough to work without breaking in the environment that it will encounter. For example, as illustrated, the middle span 18 may not be a solid piece of material. In other embodiments, the only part that may be constructed of metal may be the two-pronged foot 22, whereas the other elements may be constructed of a more lightweight, but still durable, material.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A railroad wheel reference groove locating gauge for determining a measurement of an annular reference groove machined in a face of a railroad wheel spaced radially outwardly from an axle on which the wheel is mounted a predetermined distance indicative of the wheel diameter, with the measurement being taken while the wheel remains connected to the axle, the gauge comprising:
   (a) an elongatedmember having a first end and a second end;
   (b) indicia on the elongate member at the first end thereof indicative of a length along the elongate member, said indicia exclusively adjacent the reference groove when said gauge is secured to said axle; and
   (c) an attachment element at the second end of the elongate member for detachably securing the gauge relative to an axis of rotation of the axle, with the elongate member extending radially to the first end thereof adjacent the reference groove on the wheel for enabling the use of the indicia to determine the diameter of the reference groove.

2. The gauge of claim 1 further comprising an opening formed therethrough the elongate member proximate to the indicia, through which the annular reference groove may be visible.

3. The gauge of claim 1 further comprising a handle formed in the first end of the elongate member.

4. The gauge of claim 1 wherein the attachment element comprises a first prong and a second prong together forming an arcuate path on an inner edge of the attachment element that when placed relative the axis of rotation of the axle restricts movement of the attachment element to self locate relative the axis of rotation of the axle.

5. The gauge of claim 1 wherein the measurement being taken while the wheel remains connected to the axle is occurring while the axle is attached to a railroad vehicle.

6. The gauge of claim 1 wherein detachably securing the gauge relative to an axis of rotation of the axle comprises detachably securing the gauge to at least one of a bearing attached to the axle or one of a plurality of diameters machined into the axle.

7. A railroad wheel reference groove locating gauge for determining a measurement of an annular reference groove machined in a face of a wheel while the wheel is connected to an axle which is in turn connected to a railroad vehicle, the gauge comprising:
- (a) an elongate member having a first end and a second end;
- (b) an opening formed therethrough the elongate member through which the annular reference groove may be visible;
- (c) an attachment element at the second end of the elongate member for detachably securing the gauge relative to an axis of rotation of the axle, with the elongate member extending radially to the first end thereof adjacent the reference groove on the wheel for enabling the use of the indicia to determine the diameter of the reference groove.

8. The gauge of claim 7 further comprising indicia proximate the opening and indicative of a length along the elongate member, said indicia exclusively adjacent the reference groove when said gauge is secured to said axle.

9. The gauge of claim 7 wherein the elongate member is adjustable to predetermined distances to allow the annular reference groove to be visible within the opening.

10. The gauge of claim 7 wherein detachably securing the gauge relative to an axis of rotation of the axle comprises detachably securing the gauge to at least one of a bearing attached to the axle or one of a plurality of diameters machined into the axle.

11. The gauge of claim 7 wherein the attachment element comprises a first prong and a second prong together forming an arcuate path on an inner edge of the attachment element that when placed relative the axis of rotation of the axle restricts movement of the attachment element to self-locate relative the axis of rotation of the axle.

* * * * *